US012775305B2

(12) United States Patent
Novellini

(10) Patent No.: US 12,775,305 B2
(45) Date of Patent: Oct. 27, 2026

(54) METHOD TO MOVE THE TIME OF THE DAY (TOD) ACROSS ASYNCHRONOUS CLOCK DOMAINS WITH NO LOSS IN ACCURACY

(71) Applicant: XILINX, INC., San Jose, CA (US)

(72) Inventor: Paolo Novellini, Gorgonzola (IT)

(73) Assignee: XILINX, INC., San Jose, CA (US)

( * ) Notice: Subject to any disclaimer, the term of this patent is extended or adjusted under 35 U.S.C. 154(b) by 227 days.

(21) Appl. No.: 18/752,734

(22) Filed: Jun. 24, 2024

(65) Prior Publication Data

US 2025/0390136 A1 Dec. 25, 2025

(51) Int. Cl.

| | |
|---|---|
| ***G06F 1/12*** | (2006.01) |
| ***G06F 11/16*** | (2006.01) |
| ***G06F 13/42*** | (2006.01) |
| ***H04L 5/00*** | (2006.01) |
| ***H04L 7/00*** | (2006.01) |

(52) U.S. Cl.

CPC ............ *G06F 1/12* (2013.01); *G06F 11/1604* (2013.01)

(58) Field of Classification Search

CPC ....... G06F 1/12; G06F 11/1604; G06F 11/004

See application file for complete search history.

(56) References Cited

U.S. PATENT DOCUMENTS

| | | | | |
|---|---|---|---|---|
| 8,949,468 | B2 * | 2/2015 | Carlson | G06F 9/546 709/248 |
| 2014/0126613 | A1 * | 5/2014 | Zhang | H04L 7/033 375/219 |
| 2018/0343183 | A1 * | 11/2018 | Pope | G06F 13/1689 |
| 2022/0014296 | A1 * | 1/2022 | Wang | H04J 3/0667 |
| 2024/0231417 | A9 * | 7/2024 | Shao | G06F 1/12 |

* cited by examiner

*Primary Examiner* — Xuxing Chen

(57) ABSTRACT

Methods to move Time of the Day (TOD) across asynchronous clock domains with no loss in accuracy include receiving time-of-day (TOD) words that are synchronized to a first clock, estimating a phase difference between the first clock and a second clock, sampling the TOD words based on the second clock to provide re-synchronized TOD words that are synchronized to the second clock, when the phase difference meets a timing margin, discarding the TOD words when the phase difference does not meet the timing margin, and interpolating the re-synchronized TOD words to fill gaps in the re-synchronized TOD words that correspond to the discarded TOD words. The methods may further include adjusting values of the re-synchronized TOD words based on magnitudes of the corresponding phase differences.

20 Claims, 11 Drawing Sheets

1000

METHOD TO MOVE THE TIME OF THE DAY (TOD) ACROSS ASYNCHRONOUS CLOCK DOMAINS WITH NO LOSS IN ACCURACY

TECHNICAL FIELD

Examples of the present disclosure generally relate to methods to move the Time of the Day (TOD) across asynchronous clock domains with no loss in accuracy.

BACKGROUND

A variety of systems perform functions/services based on synchronized time-of-day (TOD) counters/accumulators. Examples include, without limitation, global positioning service (GPS) satellites, fault location determination devices in power grids, communication networks (e.g., data farm servers).

In an example, a first device transmits a master TOD (e.g., a multi-bit word/vector) to a second device to permit the second device to synchronize a local TOD to the master TOD. The first device transmits the master TOD data based on a clock of the first device, and the second device samples the TOD based on a clock of the second device. If the clocks of the first and second devices are asynchronous, which is common, the second device may inadvertently sample the TOD during transitions of the first clock, which may lead to inaccurate results.

SUMMARY

Techniques for moving Time-of-Day (TOD) across asynchronous clock domains with no loss in accuracy are described. One example is an integrated circuit that includes a clock domain interface circuit that receives TOD words that are synchronized to a first clock, where the clock domain interface circuit includes a phase detector that determines a phase difference between the first clock and a second clock, sample conditioner circuitry that samples the TOD words based on the second clock to provide re-synchronized TOD words that are synchronized to the second clock, when the phase difference meets a timing margin, and that discards the TOD words when the phase difference does not meet the timing margin, and interpolation circuitry that fills gaps in the re-synchronized TOD words that correspond to the discarded TOD words.

Another example is a system that includes a receiver device that receives TOD words synchronized to a first clock, where the receiver device includes a TOD application that operates based on the TOD words and a second clock, and the clock domain interface circuit described above. The first device may represent, without limitation, an extraterrestrial satellite, a terrestrial radio station, a power grid fault detector station, or a packet-based communication network device. The system may further include a transmitter device that provides the TOD words and the first clock to the receiver device, where the transmitter device includes a TOD counter, a frequency divider that reduces a clock frequency of the TOD counter by a factor N, and a multiplier circuit that multiplies a control input of the TOD counter by the factor N.

Another example is method that includes receiving TOD words that are synchronized to a first clock, estimating a phase difference between the first clock and a second clock, sampling the TOD words based on the second clock to provide re-synchronized TOD words that are synchronized to the second clock, when the phase difference meets a timing margin, discarding the TOD words when the phase difference does not meet the timing margin, and interpolating the re-synchronized TOD words to fill gaps in the re-synchronized TOD words that correspond to the discarded TOD words. The methods may further include adjusting values of the re-synchronized TOD words based on magnitudes of the corresponding phase differences.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
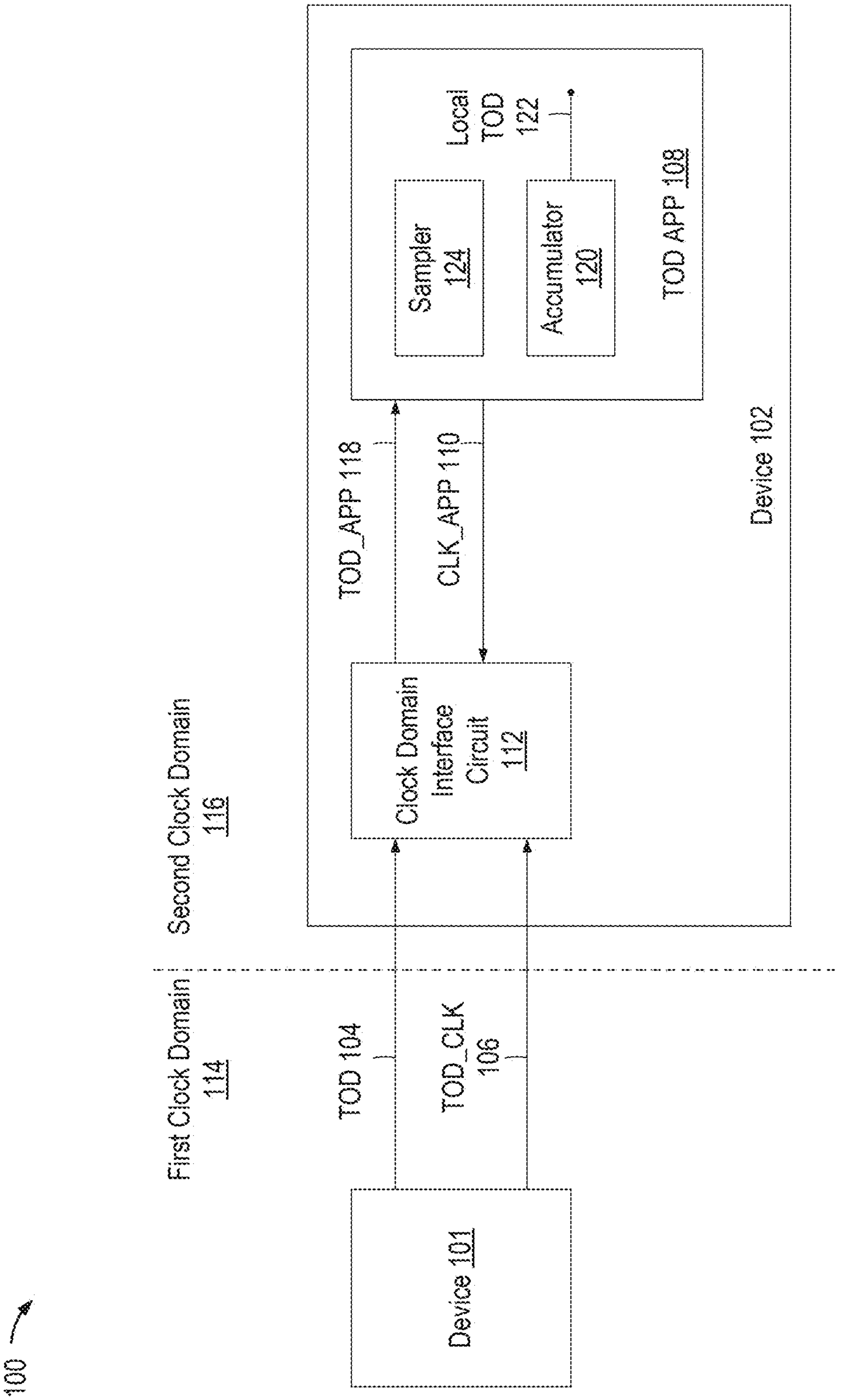
FIG. 1 is a block diagram of a system that includes first and second devices, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe methods to move the Time of the Day (TOD) across asynchronous clock domains with no loss in accuracy.

As described further above, a first device may transmit TOD based on a clock of the first device, and a second device may receive and sample the TOD based on a clock of the second device. If the clocks of the first and second devices are asynchronous, the second device may inadvertently sample the TOD during transitions of the first clock, which may lead to inaccurate results.

Alternative approaches include increasing the frequency of the clock of the first device to increase the accuracy of the TOD. This approach may not sufficiently reduce sampling errors, and may be impractical due to cost, technology, access, and/or other limitations (e.g., a designer and/or manufacturer of the second device may have no control over the design of the first device).

Another approach is for the first device to generate multiple phases of the TOD, which may permit sampling circuitry of the second device clock to estimate a position of its sampling clock relative to the a TOD clock period. This approach may also not sufficiently reduce sampling errors, and may be impractical due to cost, technology, access, and/or other limitations (e.g., the sampling circuitry may use a clock tree each time it needs to detect a new phase of the TOD, but the number of clock trees may be limited by technology/cost).

Another approach is for the second device to lock its clock to the clock of the first device based on phase differences between the clocks. This approach may permit the second device to accurately sample the TOD, but poses stringent requirements on the clocking architecture of the second device and may thus be impractical for many applications.

Methods to move the TOD across asynchronous clock domains, as disclosed herein, permit a device/application to sample the TOD, as-needed, in a time domain of the device, hence with no loss in accuracy.

Methods to move the TOD across asynchronous clock domains, as disclosed herein, may include relatively small blocks of circuitry that perform well-understood functions, in a novel way.

FIG. 1 is a block diagram of a system 100 that includes first and second devices 101 and 102, according to an embodiment. In FIG. 1, device 101 output/transmits (e.g., by-wire and/or wirelessly) a TOD 104 and a first clock, illustrated here as a TOD_CLK 106. TOD 104 may represent a stream of TOD/vectors clocked at a rate of (i.e., synchronized to) TOD_CLK 106. Device 101 may include a free-running accumulator that generates TOD 104. Alternatively, device 101 may provide TOD 104 based on a TOD of another device.

System 100 may represent, for example and without limitation, a networking system in which device 101 provides TOD 104 to other network devices, including device 102. In this example, TOD 104 may represent a grandmaster TOD, such as defined by an IEEE standard.

In the example of FIG. 1, device 102 includes an application 108 that performs functions based on TOD 104 and a second clock, illustrated here as a CLK_APP 112. Application 108 may include circuitry and/or a computer program that executes on a processor.

Where TOD_CLK 106 and CLK_APP 110 are asynchronous, device 102 may further include a clock domain interface circuit 112 that moves TOD 104 from a first clock domain 114 of system 100, into a second clock domain 116 of system 200. Clock domain interface circuit 112 essentially converts TOD 104, which is synchronized to TOD_CLK 106, to TOD_APP 118, which is synchronized to CLK_APP 110.

Application 108 may use TOD_APP 118 as a local TOD. Alternatively, application 108 may include an accumulator 120 that maintains a local TOD 122, and a sampler 124 that periodically samples TOD_APP 118 to synchronize local TOD 122 to TOD_APP 118. Application 108 may synchronize local TOD 122 to TOD_APP 118 by steering a local TOD clock and/or an increment control of accumulator 120.

Device 102 may represent, for example and without limitation, an extraterrestrial device (e.g., a probe, a satellite, and/or other space craft), a power grid-based fault location determination device, radio station of a radio network (e.g., a cellular and/or other communication network), an Internet and/or data farm server, and/or other device.

Figure 2:
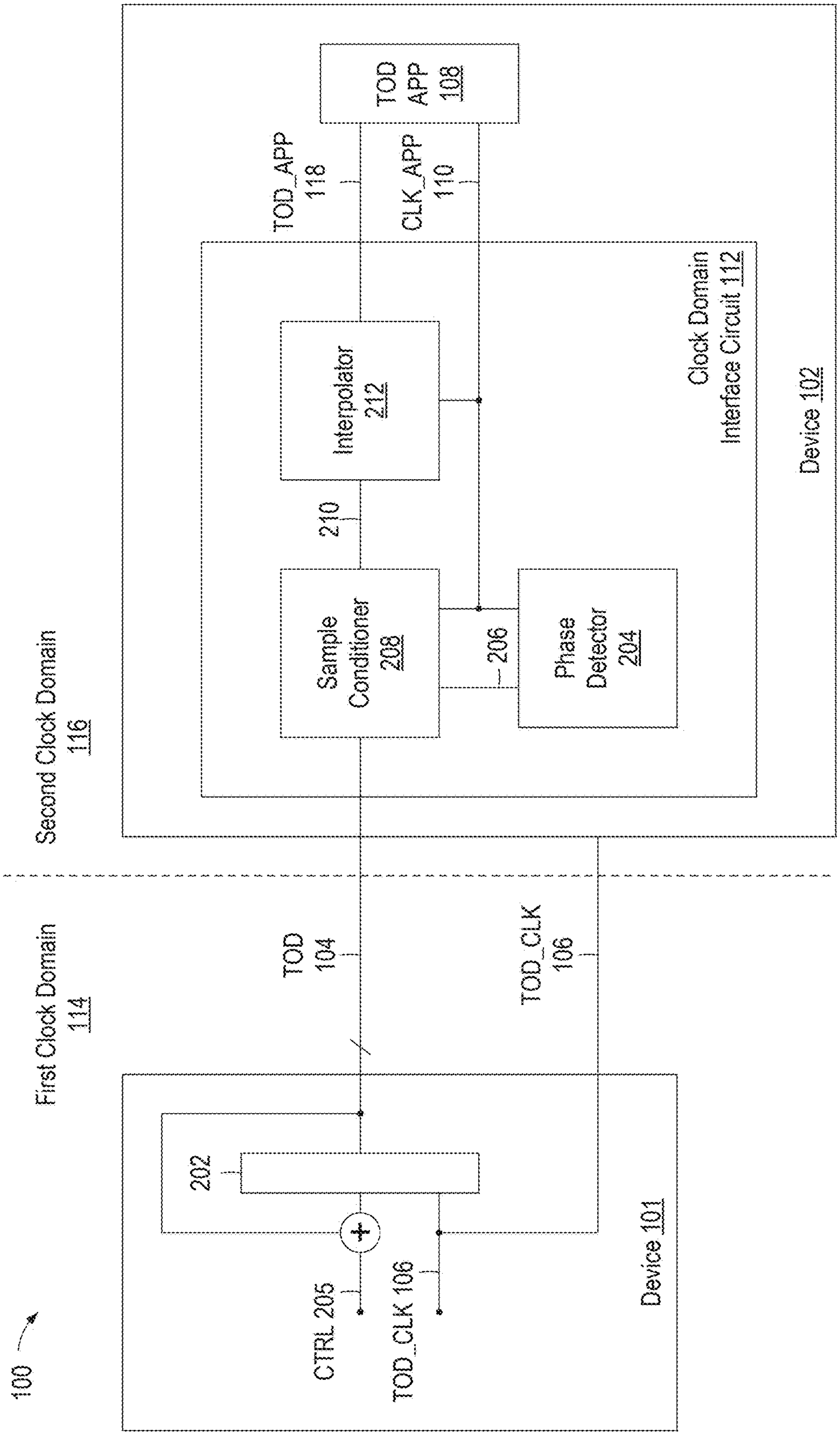
FIG. 2 depicts features of a clock domain interface circuit of the second device, according to an embodiment.

FIG. 2 is a block diagram of system 100, according to an embodiment. In FIG. 2, device 101 includes an TOD counter or accumulator 202 that updates TOD 104 based on TOD_CLK 106, a control, CTRL 205, and prior states of TOD 104.

Further in FIG. 2, clock domain interface circuit 112 includes a phase detector 204, a sample conditioner 208, and an interpolator 212. Phase detector 204 determines phase differences 206 between TOD_CLK 106 and CLK_APP 110, based on APP_CLK 110 (e.g., based on rising and/or falling edges of CLK_APP 110).

Sample conditioner 208 samples TOD 104 based on CLK_APP 110 to provide re-synchronized TOD 210, which is synchronized to CLK_APP 110. Sample conditioner 208 may determine when it is "timing safe" to sample TOD 104, or safe to retain samples thereof, based on phase differences 206. Sample conditioner 208 may discard TOD 104, or samples thereof, during times at which when phase differences 206 do not meet a timing margin condition of sample conditioner 208.

Sample conditioner 208 may also adjust values of TOD 104, or samples thereof, based on magnitudes of phase differences 206. This may be useful to essentially interpolate between values of successive words/vectors of TOD 104 based on times at which the successive words/vectors are sampled. Sample conditioner 208 may sample, discard, and adjust the values in one or more of a variety of sequences.

When sample conditioner 208 discards TOD 104, or samples thereof, there will be corresponding gaps in re-synchronized TOD 210. Interpolator 212 fills the gaps to provide TOD_APP 118, which is synchronized to the CLK_APP 110. Clock domain interface circuit 112 is not limited to the examples of FIG. 2.

Figure 3:
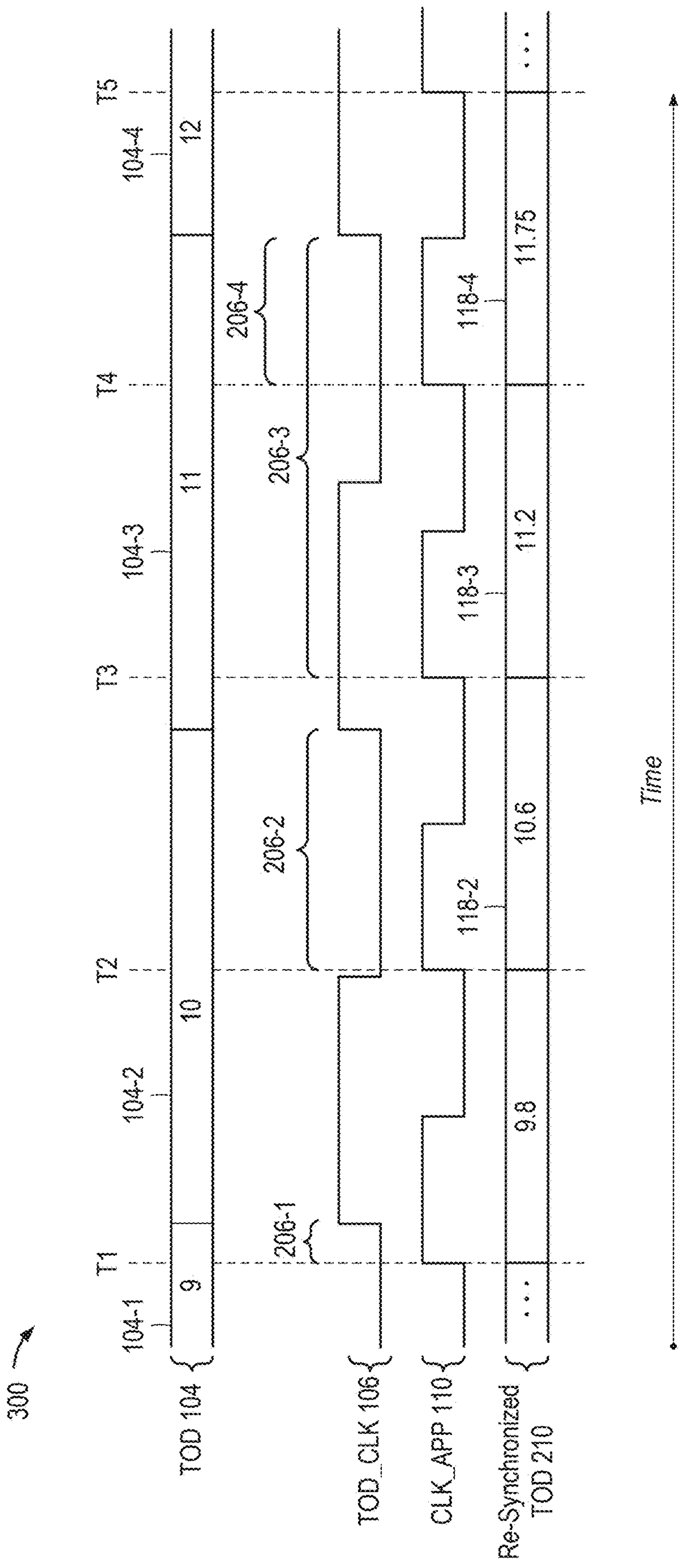
FIG. 3 depicts a timing diagram for the clock domain interface circuit, according to an embodiment.

FIG. 3 depicts a timing diagram 300, according to an embodiment in which sample conditioner 208 adjusts the values of TOD 104, or samples thereof, based on magnitudes of phase differences 206. In FIG. 3, TOD 104 and TOD_APP 118 are depicted with nominal word values, for illustrative purposes.

At time T1, sample conditioner 208 samples a word 104-1 of TOD 104, near an end of a corresponding period of TOD_CLK 106. Word 104-1 has a value of 9. A subsequent word 104-2 of TOD 104 has a value of 10. In this example, sample conditioner 208 outputs a word 118-1 of re-synchronized TOD 210 with a value of 9.8 based on a phase difference 206-1.

At time T2, sample conditioner 208 samples word 104-2 of TOD 104, just after a mid-point of a corresponding period of TOD_CLK 106. Word 104-2 has a value of 10. A subsequent word 104-3 of TOD 104 has a value of 11. In this example, sample conditioner 208 outputs a word 118-2 of re-synchronized TOD 210 with a value of 10.6 based on a phase difference 206-2.

At time T3, sample conditioner 208 samples word 104-3 of TOD 104, early in a corresponding period of TOD_CLK 106. Word 104-3 has a value of 11. A subsequent word 104-4 of TOD 104 has a value of 12. In this example, sample conditioner 208 outputs a word 118-3 of re-synchronized TOD 210 with a value of 11.2 based on a phase difference 206-3.

At time T4, sample conditioner 208 again samples word 104-3, late in the corresponding period of TOD_CLK 106. In this example, sample conditioner 208 outputs a word 118-4 of re-synchronized TOD 210 with a value of 11.75 based on a phase difference 206-4.

Figure 4:
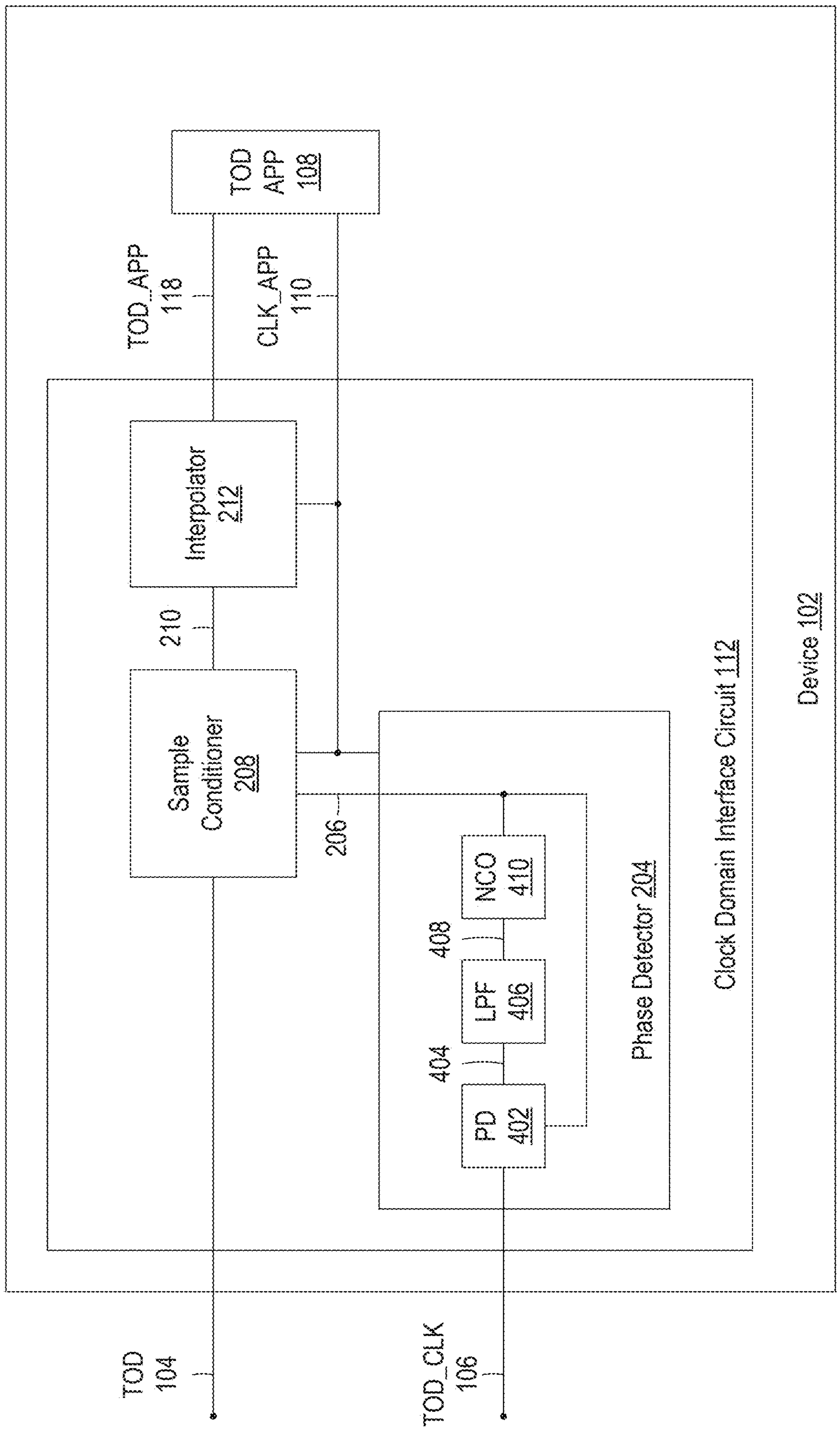
FIG. 4 depicts features of a phase detector of the clock domain interface circuit, according to an embodiment.

FIG. 4 depicts features of phase detector 204, according to an embodiment. In the example of FIG. 4, phase detector 204 is depicted as a digital phase-locked loop (DPLL), which may be referred to as a qualifying DPLL. In FIG. 4, phase detector 204 includes a phase detector (PD) 402 that determines/estimates phase differences 404 between TOD_CLK 106 and CLK_APP 110, based on CLK_APP 110 (i.e., based on rising and/or falling edges of CLK_APP 110). Phase detector 204 further includes a low pass filter (LPF) 406 that filters (e.g., averages or integrates) phase differences 404. Phase detector 204 further includes a numerically controlled oscillator (NCO) 410 that converts filtered phase differences 408 to numerical values and outputs the numerical values as phase differences 206. Phase differences 206 may serve as filtered, relative measures of the phase differences. Phase detector 204 is not limited to the example of FIG. 4.

Figure 5A:
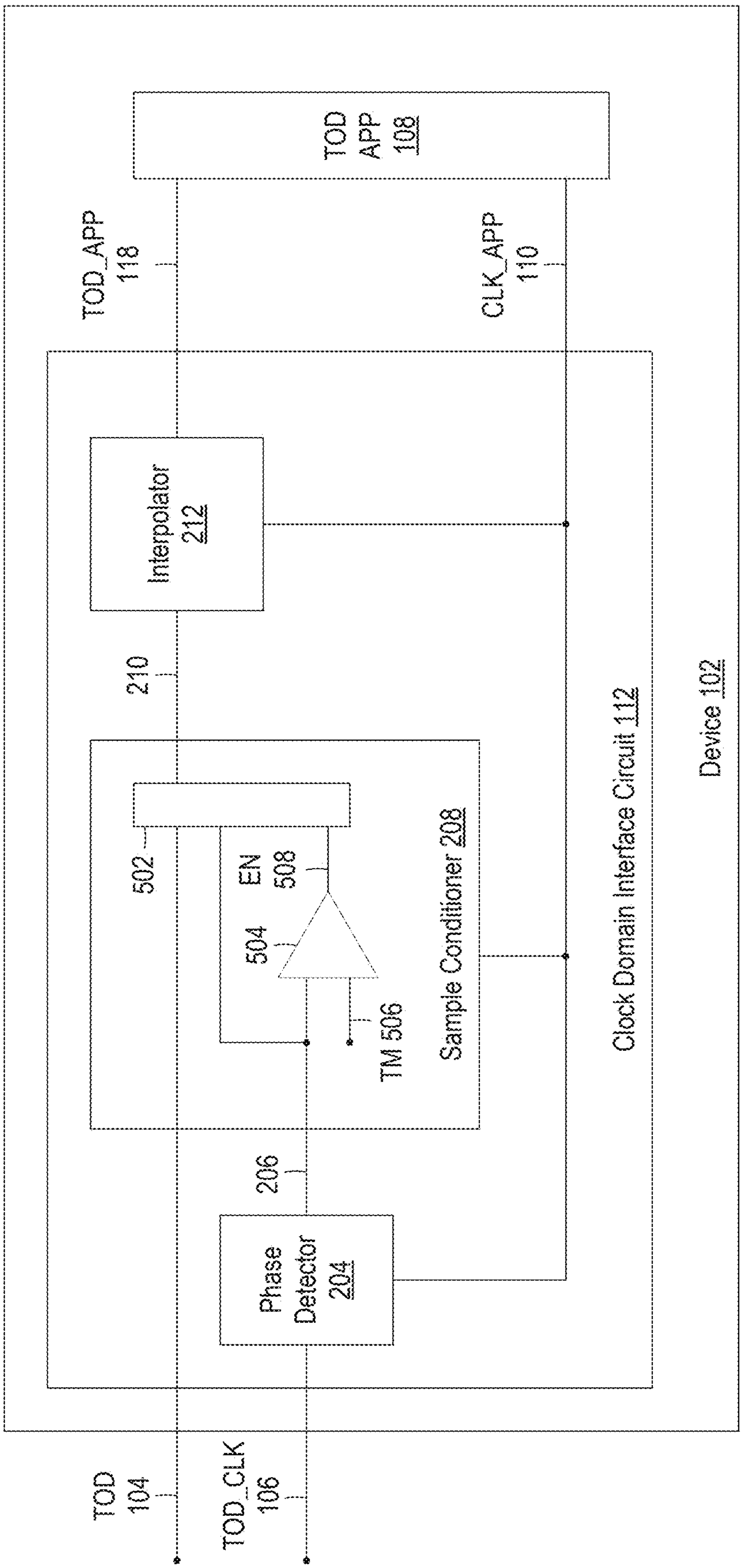
FIG. 5A depicts features of a sample conditioner of the clock domain interface circuit, according to an embodiment.

FIG. 5A depicts features of sample conditioner 208, according to an embodiment. In the example of FIG. 5A, sample conditioner 208 includes an accumulator 502 that samples TOD 104 based on CLK_APP 110, and outputs re-synchronized TOD 210, which is synchronized with CLK_APP 110.

Sample conditioner 208 may further include qualifying circuitry 504 that demines whether to sample or discard TOD 104 based on phase differences 206 and a threshold or condition, illustrated here as a timing margin (TM) 506. Timing margin 506 may be based on setup and hold times of accumulator 502. As an example, sample conditioner 208 may discard TOD 104, or samples thereof, when phase differences 206 fall outside of a specified range. Boundaries of the range may correspond to the setup and hold times. The hold time may correspond to one unit interval (UI) of CLK_APP.

In FIG. 5A, qualifying circuitry 504 controls an enable input EN 508 of accumulator 502. In this example, qualifying circuitry 504 may preclude accumulator 502 from sampling TOD 104 and/or may preclude accumulator 502 from outputting samples of the TOD 104 (i.e., leaving gaps in re-synchronized TOD 210). An example is illustrated in FIG. 5B.

Figure 5B:
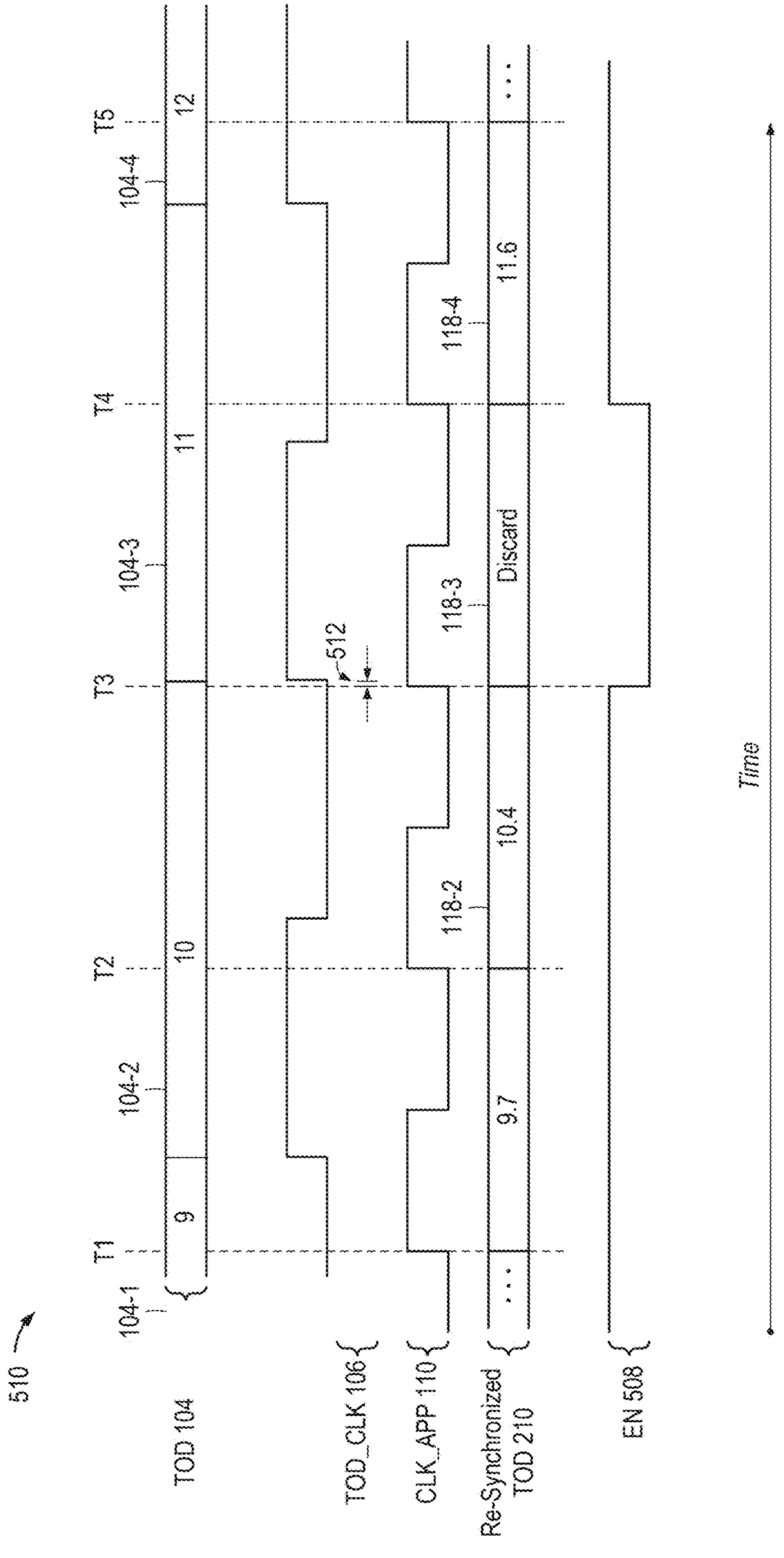
FIG. 5B depicts another timing diagram for the clock domain interface circuit, according to an embodiment.

FIG. 5B depicts a timing diagram 510, according to an embodiment. Timing diagram 510 is similar to timing diagram 300, with the addition of EN 508. In addition, TOD 104 and TOD_CLK 106 are shifted to the right, relative to FIG. 3, such that, at time T3, a phase difference 512 between TOD_CLK 106 and CLK_APP 100 is below a specified setup time. In this situation, qualifying circuitry 504 deactivates EN 508 to discard word 118-3 of re-synchronized TOD 210. In the example of FIG. 5, EN 508 is depicted as disabled for a single cycle of CLK_APP 110. Where phase differences 206 are filtered by phase detector 204, EN 508 may remain disabled for multiple cycles of CLK_APP 110.

Further in FIG. 5B, values of remaining words 118-1, 118-2, and 118-3 of re-synchronized TOD 210 are adjusted to reflect changes to the corresponding phase differences. In FIG. 5A, phase differences 206 are provided to accumulator 502 to permit accumulator 502 to make the adjustments. Alternatively, sample conditioner 208 may include other circuitry to make the adjustments.

As described above, phase differences 206 (e.g., numerical values) may be used to determine when it is "timing safe" to sample TOD 104, and to adjust/interpolate values of samples of TOD 104. Sample conditioner 208 is not limited to the example of FIG. 5.

Figure 6:
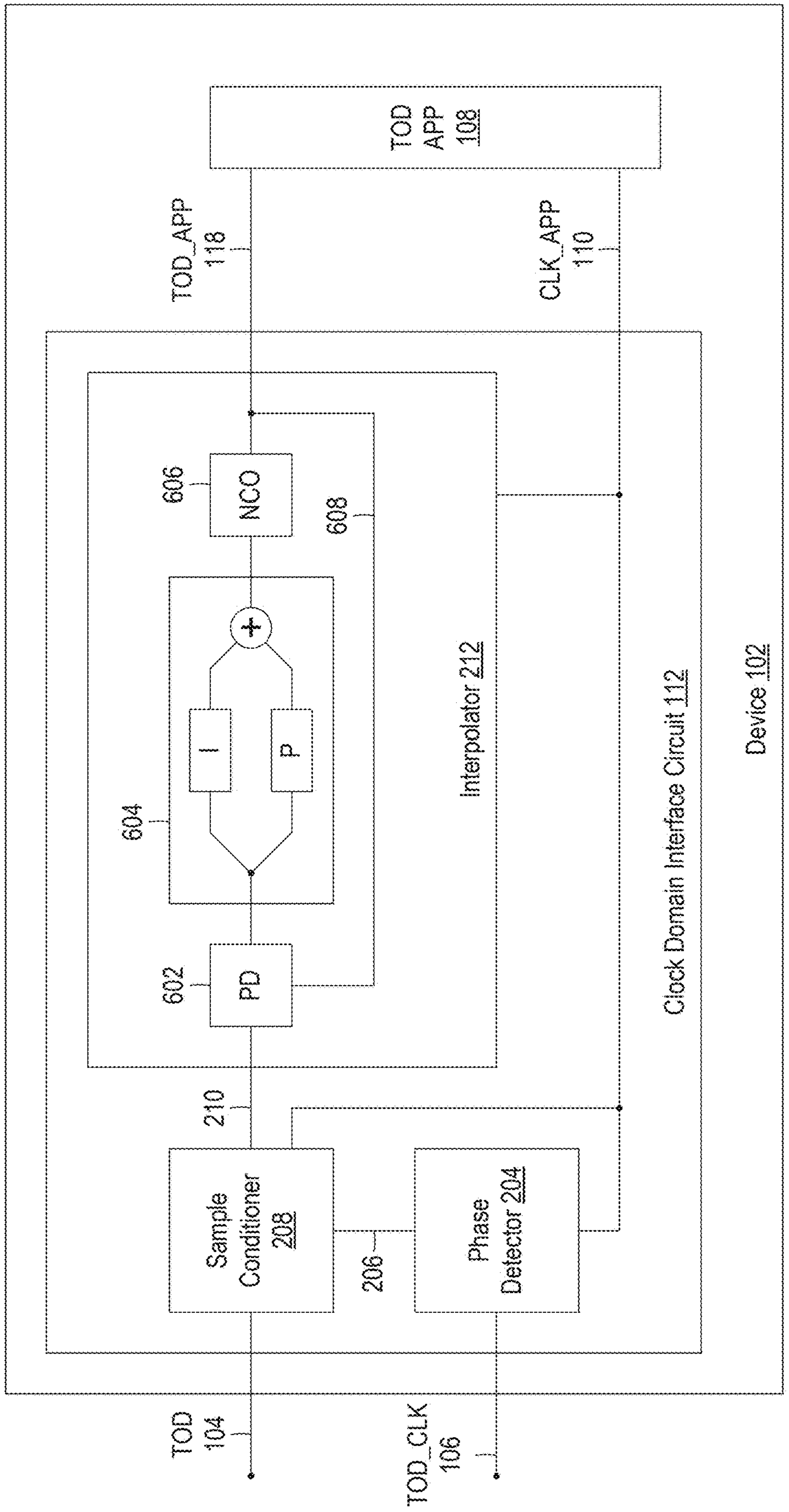
FIG. 6 depicts features of an interpolator of the clock domain interface circuit, according to an embodiment.

FIG. 6 depicts features of interpolator 212, according to an embodiment. In the example of FIG. 6, interpolator 212 is depicted as a filtering DPLL that include a phase detector (PD) 602 that estimates a difference between re-synchronized TOD 210 and a numerical output 608 (i.e., TOD_APP 118), a filter 604 that filters/interpolates an output of phase detector 602, and a numerically controlled oscillator 606 that converts an output of filter 604 to numerical output 608.

As described further above, sample conditioner 208 may selectively sample/discard TOD 104 when it is safe to do so from a timing standpoint (i.e., based on phase differences 206). If TOD_CLK 106 suffers from high frequency jitter, and if phase detector includes LPF 406 in FIG. 4, phase differences 206 may be correct on average, but a situation may arise in which phase differences 206 are within timing margin 506 when, in fact, it may not be safe to sample TOD 104 due to jitter. Methods of compensating for jitter on are provided below with reference to FIG. 7.

Figure 7:
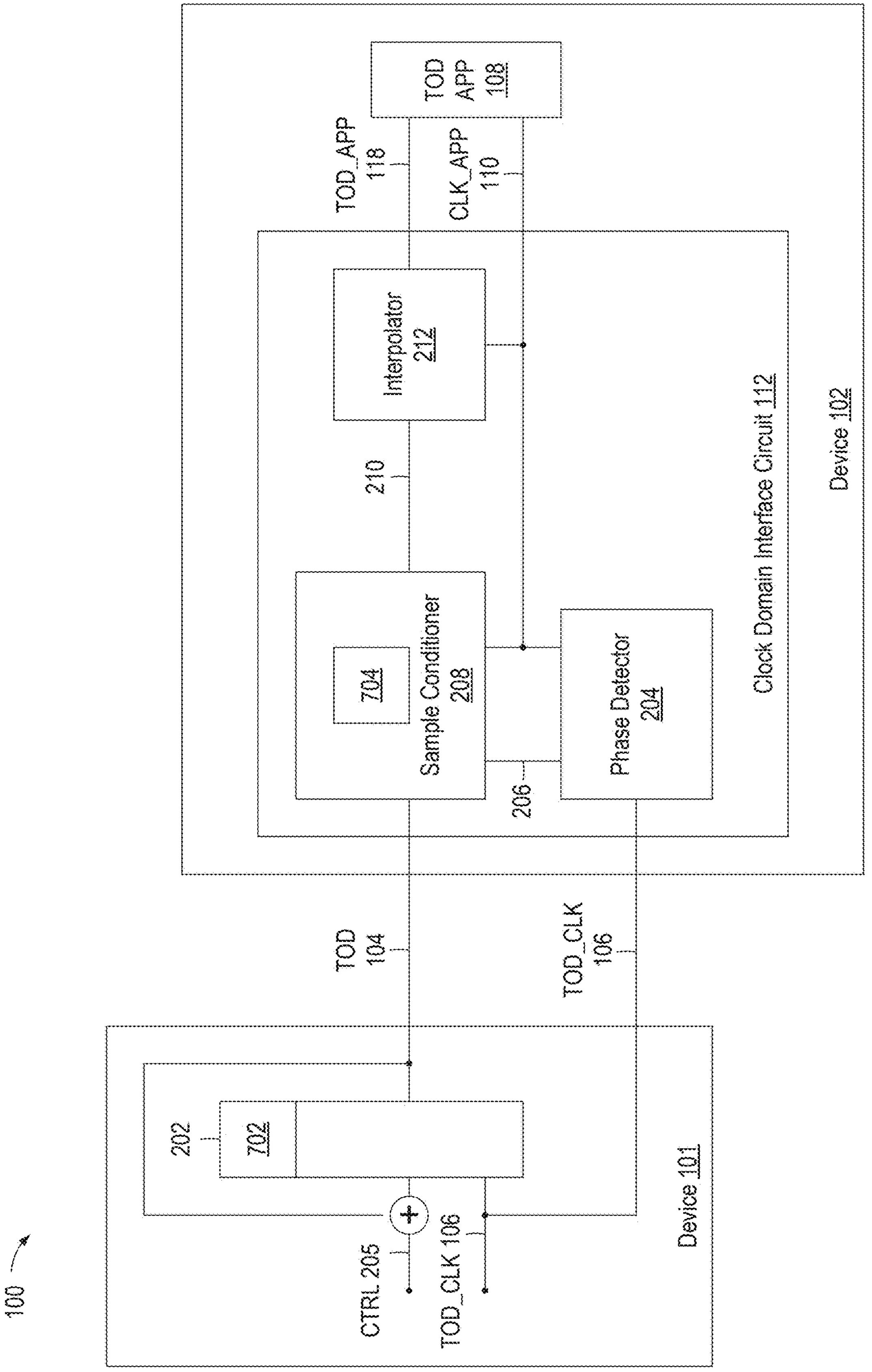
FIG. 7 depicts error detection features of the system, according to an embodiment.

FIG. 7 is a block diagram of system 100, according to an embodiment. In the example of FIG. 7, device 101 further includes an error detection code generator 702 that determines error detection codes based on words/vectors of TOD 104 and appends the error detection codes to the respective words/vectors. Error detection code generator 702 may determine the error detection codes based on one or more of a variety of methods such as, without limitation, a cyclic redundancy code (CRC). Further in FIG. 7, sample conditioner 208 includes corresponding error detection circuitry 704 that detect errors in TOD 104 based on the appended error detection codes. Error detection circuitry 704 may perform error detection with respect to samples of TOD 104, prior to adjusting values of the samples based on phase differences. Sample conditioner 208 may discard or correct word/vectors in which errors are detected.

In the foregoing examples, the frequency of TOD_CLK 106 may be lower than the frequency of CLK_APP. If the frequency of TOD_CLK 106 is higher than the frequency of CLK_APP, sample conditioner 208 may fail to sample all words/vectors of TOD 104. Where the frequency of TOD_CLK 106 is higher than the frequency of CLK_APP, device 101 may include additional circuitry, such as described below with reference to FIG. 8.

Figure 8:
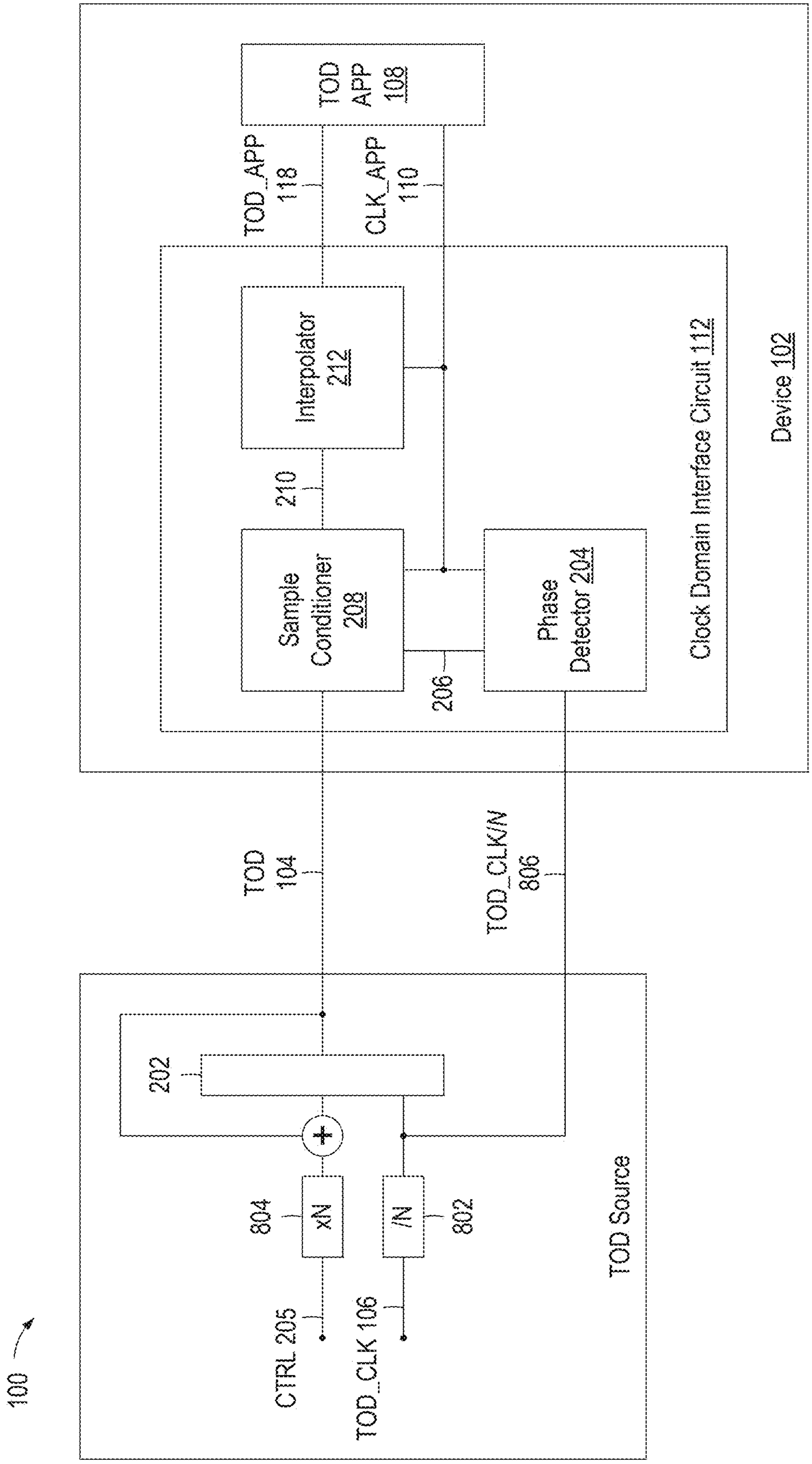
FIG. 8 depicts features of the first device, according to an embodiment.

FIG. 8 is a block diagram of system 100, according to an embodiment. In the example of FIG. 8, device 101 further includes a frequency divider 802 that reduces a frequency of TOD_CLK 106 by N, where N is a positive integer. N may be selected to provide device 102 with a TOD_CLK/N 806 having a frequency that is below the frequency of CLK_APP 110. Device 101 may further include a multiplier 804 that multiplies CTRL 205 by N.

In the foregoing examples, TOD_CLK 106 and CLK_APP are asynchronous. If TOD_CLK 106 and CLK_APP are synchronous with one another, phase differences 206 will be zero, in which case sample conditioner 208 may determine that it never "timing safe" to sample TOD 104. In such a situation, device 102 may include multiple tiers of clock domain interface circuitry, such as described below with reference to FIG. 9.

Figure 9:
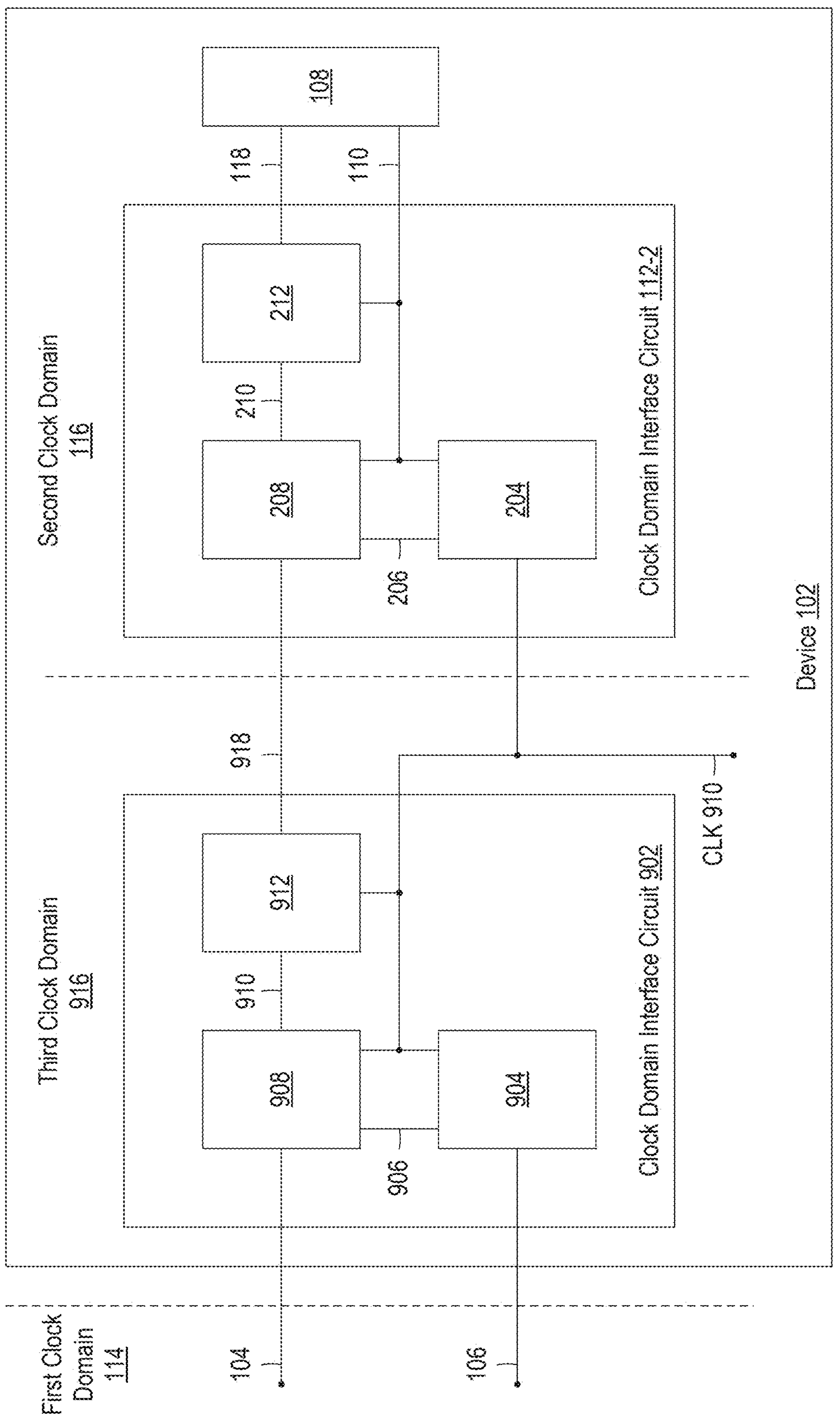
FIG. 9 is a block diagram of the second device, including multiple cascaded clock domain interface circuits, according to an embodiment.

FIG. 9 is a block diagram of device 102, according to an embodiment. In the example of FIG. 9, device 102 further includes a second clock domain interface circuit 902 that includes a phase detector 904, a sample conditioner 908, and an interpolator 912. Phase detector 904 determines a phase difference 906 between TOD_CLK 106 and a third clock, CLK 910, such as described further above with respect to phase detector 204. Sample conditioner 908 samples TOD 104 based on CLK 910 to provide a re-synchronized TOD 918, which is synchronized to CLK_APP 110, such as described further above with respect to sample conditioner 208. Interpolator 912 fills gaps in re-synchronized TOD 918, such as described further above with respect to interpolator 212. Clock domain interface circuit 112 operates as described in one or more examples above, based on re-synchronized TOD 918 in place of TOD 104, and based on CLK 910 in place of TOD_CLK 106.

In FIG. 9, clock domain interface circuit 902 essentially moves TOD 104 from clock domain 114 of device 101 to a clock domain 916 of CLK 912, and clock domain interface circuit 112-2 moves TOD 918 from clock domain 916 into clock domain 116 of CLK_APP 110.

In an example, TOD_CLK 106, CLK 910, and CLK_APP 110 are synchronized with one another, the frequency of TOD_CLK 106 is higher than the frequency of CLK_APP 110, and the frequency of CLK 910 is between the frequencies of TOD_CLK 106 and CLK_APP 110.

The foregoing examples presented with reference to FIGS. 1-9 may be useful individually and in various combinations with one another.

Figure 10:
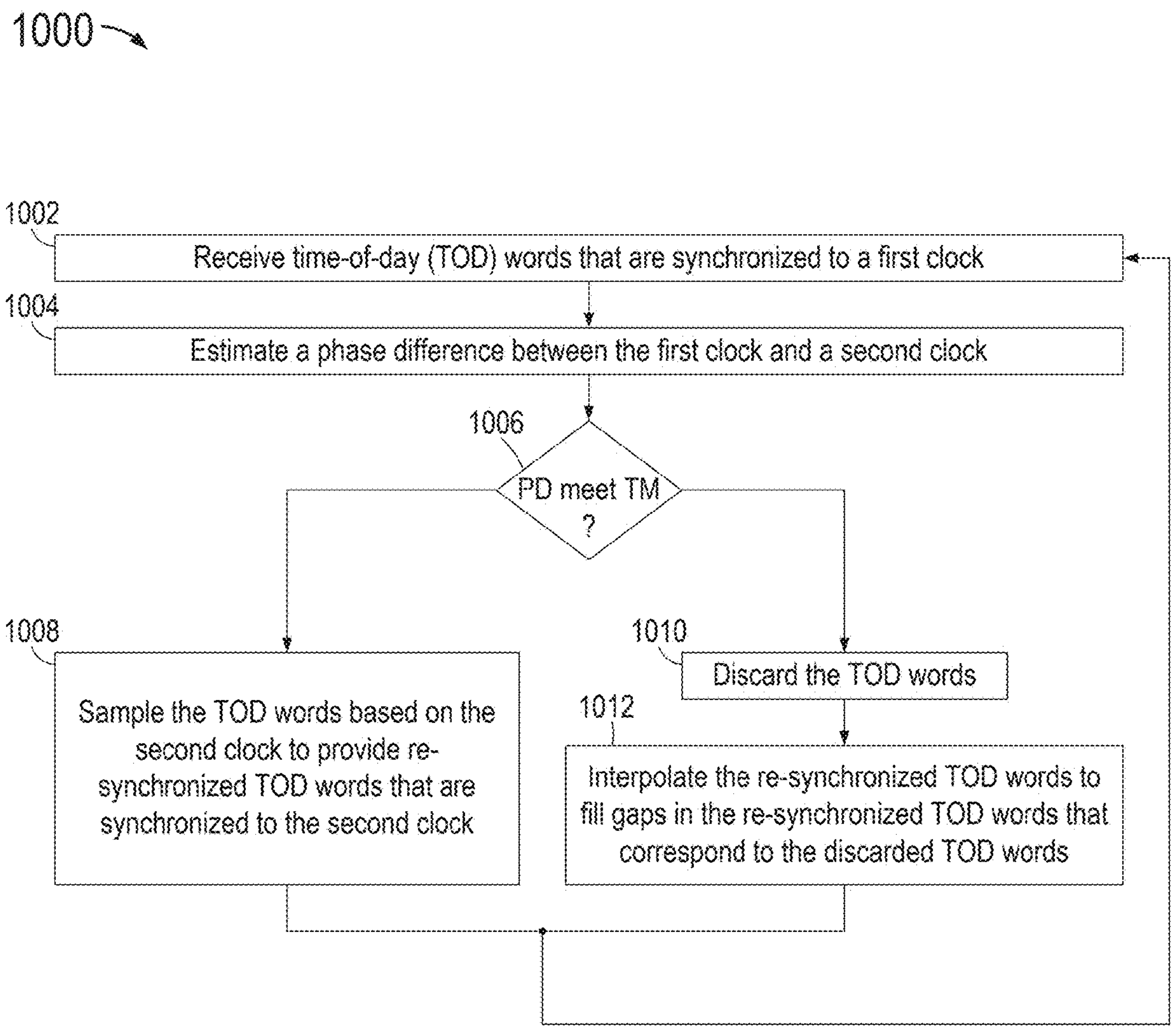
FIG. 10 depicts a method 1000 of moving time of day (TOD) across asynchronous clock domains, according to an embodiment.

FIG. 10 depicts a method 1000 of moving time of day (TOD) across asynchronous clock domains, according to an embodiment. Method 1000 is described below with reference to FIGS. 1-9. Method 100 is not, however, limited to the examples of FIGS. 1-9.

At 1002, clock domain interface circuit 112 receives time-of-day (TOD) 104 words that are synchronized to TOD_CLK 106.

At 1004, phase detector 204 estimates phase difference 206 between TOD_CLK 106 and CLK_APP 110.

At 1006, if phase difference 206 meets timing margin 506, processing proceeds to 1008, where sample conditioner 208 samples TOD 104 words based on CLK_APP 110 to provide re-synchronized TOD 210 words that are synchronized to CLK_APP 110.

If phase difference 206 does not meet timing margin 506, processing proceeds to 1010, where sample conditioner 208 discards TOD 104 words, such as described further above with reference to FIG. 5B. Processing then proceeds to 1012, where interpolator 212 interpolates re-synchronized TOD 210 words to fill gaps in re-synchronized TOD 210 words that correspond to the discarded TOD 104 words.

In an example, sample conditioner 208 adjusts values of the re-synchronized TOD words based on corresponding magnitudes of phase difference 260, such as described further above with reference to FIG. 3.

In another example, sample conditioner 208 adjusts a value of a first one of re-synchronized TOD 210 words based on values of a corresponding one of TOD 104 words and one or more adjacent TOD 104 words, and based further on a magnitude of phase difference 206 when the corresponding TOD 104 word is sampled.

In another example, error detection circuitry 704 determines error detection codes from re-synchronized TOD 21 words, and detects jitter-induced errors in re-synchronized TOD 210 words based on the error detection codes.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:

a first clock domain interface circuit configured to receive time-of-day (TOD) words that are synchronized to a first clock, comprising, a phase detector configured to determine a phase difference between the first clock and a second clock, sample conditioner circuitry configured to sample the TOD words based on the second clock to provide re-synchronized TOD words that are synchronized to the second clock, when the phase difference meets a timing margin, and to discard the TOD words when the phase difference does not meet the timing margin; and interpolation circuitry configured to fill gaps in the re-synchronized TOD words that correspond to the discarded TOD words.

2. The integrated circuit of claim 1, wherein the sample conditioner circuitry is further configured to adjust values of the re-synchronized TOD words based on magnitudes of the phase difference.

3. The integrated circuit of claim 1, wherein the sample conditioner circuitry is further configured to adjust a value of a first one of the re-synchronized TOD words based on values of a corresponding one of the TOD words and one or more adjacent ones of the TOD words, and a magnitude of the phase difference when the corresponding TOD word is sampled.

4. The integrated circuit of claim 1, wherein the timing margin is based on setup and hold times of sampling circuitry of the sample conditioner circuit.

5. The integrated circuit of claim 1, wherein the phase detector comprises a digital phase locked loop (DPLL) that comprises:

a low pass filter configured to filter an estimated phase difference; and a numerically controlled oscillator configured to output the phase difference as a numerical value.

6. The integrated circuit of claim 1, wherein the interpolation circuitry comprises a filtering digital phase locked loop (DPLL):

a difference detector configured to estimate a difference between the re-synchronized TOD words and a numerical output of the filtering DPLL;

a low pass filter configured to filter the difference; and a numerically controlled oscillator configured to convert an output of the low pass filter to the numerical output of value the filtering DPLL.

7. The integrated circuit of claim 1, wherein the sample conditioner circuitry further comprises:

error detection circuitry configured to detect jitter-induced errors of the TOD words based on error detection codes appended to the TOD words.

8. The integrated circuit of claim 7, wherein the error detection circuitry is further configured to determine the error detection codes from the re-synchronized TOD words, and to detect the jitter-induced errors in the re-synchronized TOD words.

9. The integrated circuit of claim 8, wherein:
the sample conditioner circuitry is further configured to discard re-synchronized TOD words that contain jitter-induced errors; and
the interpolation circuitry is further configured to fill gaps in the re-synchronized TOD words that correspond to the discarded re-synchronized TOD words.

10. The integrated circuit of claim 1, further comprising a second clock domain interface circuit that comprises:
a phase detector configured to determine a phase difference between the second clock and a third clock;
sample conditioner circuitry configured to sample the re-synchronized TOD words based on the third clock to provide re-synchronized TOD words that are synchronized to the third clock, when the phase difference between the second and third clocks meet a threshold condition; and
interpolation circuitry configured to fill gaps in the re-synchronized TOD words that are synchronized to the third clock, when the phase difference between the second and third clocks do not meet the timing margin.

11. A system, comprising:
a receiver device configured to receive time-of-day (TOD) words synchronized to a first clock, wherein the receiver device comprises a TOD application that operates based on the TOD words and a second clock, and a clock domain interface circuit that comprises,
a phase detector configured to determine a phase difference between the first and second clocks,
sample conditioner circuitry configured to sample the TOD words based on the second clock to provide re-synchronized TOD words that are synchronized to the second clock, when the phase difference corresponding to the respective TODs meets a timing margin, and to discard the TOD words when the phase difference does not meet the timing margin; and
interpolation circuitry configured to fill gaps in the re-synchronized TOD words that correspond to the discarded TOD words.

12. The system of claim 11, further comprising a transmitter device configured to provide the TOD words and the first clock to the receiver device, wherein the transmitter device comprises:
a TOD counter;
a frequency divider configured to reduce a clock frequency of the TOD counter by a factor N; and
a multiplier circuit configured to multiply a control input of the TOD counter by the factor N.

13. The system of claim 11, wherein the receiver device comprises a packet-based communication network device.

14. The system of claim 11, wherein the sample conditioner circuitry is further configured to adjust values of the re-synchronized TOD words based on corresponding magnitudes of the phase difference.

15. The system of claim 11, wherein the sample conditioner circuitry is further configured to adjust a value of a first one of the re-synchronized TOD words based on values of a corresponding one of the TOD words and one or more adjacent ones of the TOD words, and a magnitude of the phase difference when the corresponding TOD word is sampled.

16. The system of claim 11, wherein the sample conditioner circuitry further comprises error detection circuitry configured to
determine error detection codes from the re-synchronized TOD words; and
detect jitter-induced errors in the re-synchronized TOD words based on the error detection codes.

17. A method, comprising:
receiving time-of-day (TOD) words that are synchronized to a first clock;
estimating a phase difference between the first clock and a second clock;
sampling the TOD words based on the second clock to provide re-synchronized TOD words that are synchronized to the second clock, when the phase difference meets a timing margin;
discarding the TOD words when the phase difference does not meet the timing margin; and
interpolating the re-synchronized TOD words to fill gaps in the re-synchronized TOD words that correspond to the discarded TOD words.

18. The method of claim 17, further comprising:
adjusting values of the re-synchronized TOD words based on corresponding magnitudes of the phase difference.

19. The method of claim 17, further comprising:
adjusting a value of a first one of the re-synchronized TOD words based on values of a corresponding one of the TOD words and one or more adjacent ones of the TOD words, and based further on a magnitude of the phase difference when the corresponding TOD word is sampled.

20. The method of claim 17, further comprising:
determining error detection codes from the re-synchronized TOD words; and
detecting jitter-induced errors in the re-synchronized TOD words based on the error detection codes.

* * * * *